United States Patent
Pursley

(10) Patent No.: US 7,617,792 B1
(45) Date of Patent: Nov. 17, 2009

(54) BUMPER ASSEMBLY FOR POSTS AND PILINGS

(76) Inventor: Matt D. Pursley, c/o Impact Medical Technologies, 311 Curie Dr., Alpharetta, GA (US) 30005

( * ) Notice: Subject to any disclaimer, the term of this patent is extended or adjusted under 35 U.S.C. 154(b) by 189 days.

(21) Appl. No.: 11/432,035

(22) Filed: May 10, 2006

Related U.S. Application Data

(60) Provisional application No. 60/679,737, filed on May 10, 2005.

(51) Int. Cl.
*B63B 59/02* (2006.01)

(52) U.S. Cl. .................... 114/219; 405/211; 405/216

(58) Field of Classification Search ............... 114/219, 114/220; 405/211, 212, 213, 215, 216; 404/6
See application file for complete search history.

(56) References Cited

U.S. PATENT DOCUMENTS

| | | | | |
|---|---|---|---|---|
| 4,378,749 A | * | 4/1983 | Leblanc et al. | 114/220 |
| 4,411,556 A | * | 10/1983 | Leblanc et al. | 405/213 |
| 5,264,259 A | * | 11/1993 | Satoh et al. | 114/219 |
| 5,409,199 A | * | 4/1995 | Kahmann | 114/220 |
| 5,497,723 A | * | 3/1996 | Chase | 114/219 |
| 5,518,342 A | * | 5/1996 | Wright et al. | 405/211 |
| 5,562,364 A | * | 10/1996 | Darder-Alomar | 405/215 |
| 6,102,611 A | * | 8/2000 | Roller | 405/216 |
| 6,406,221 B1 | * | 6/2002 | Collier | 405/213 |
| 6,427,411 B2 | * | 8/2002 | Shows | 114/219 |
| 7,150,241 B1 | * | 12/2006 | Boutaghou | 114/219 |
| 2002/0050241 A1 | * | 5/2002 | Leonard et al. | 114/220 |

* cited by examiner

*Primary Examiner*—Lars A Olson
(74) *Attorney, Agent, or Firm*—Jeffrey L. Thompson; Thompson & Thompson, P.A.

(57) ABSTRACT

A bumper assembly for attachment to a post has a hollow bumper member with an internal bore that fits over a post and allows the bumper member to rotate. A protective liner is provided between the bumper member and the post and has an internal bore that fits around the post and an external wear surface that fits within and rotatably supports the bumper member. A retaining ring can be secured to the post to hold the bumper assembly in place vertically. Alternatively, the hollow bumper member can be provided with end faces that interact with the upper and lower surfaces of a protective liner positioned within the hollow bumper member to hold the bumper assembly in place vertically. The components of the bumper assembly can be split along one side or provided as two separate halves attachable together to facilitate attachment to posts that are restrained on both ends.

17 Claims, 6 Drawing Sheets

Fig. 11
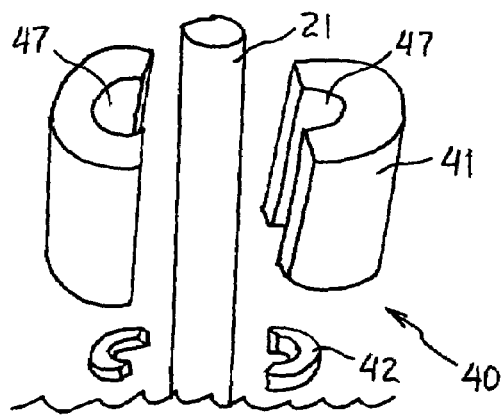
Fig. 12
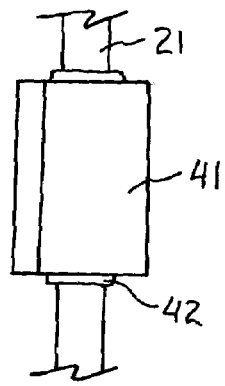
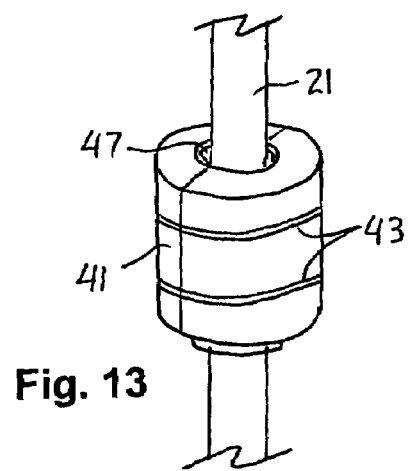
Fig. 13
Fig. 17
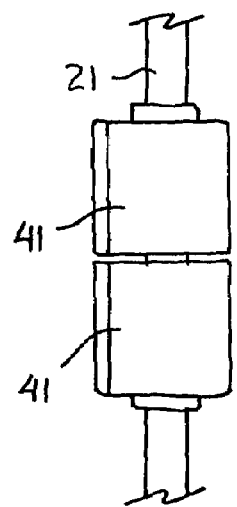
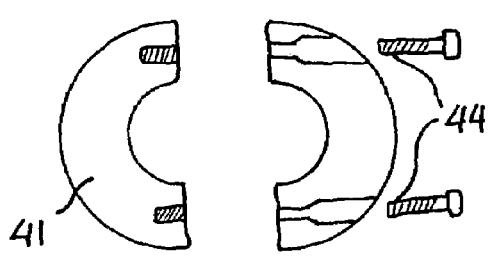
Fig. 14
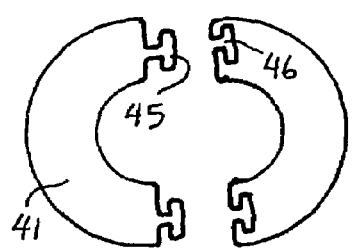
Fig. 15
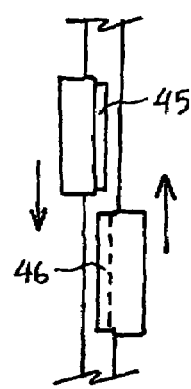
Fig. 16

Fig. 18
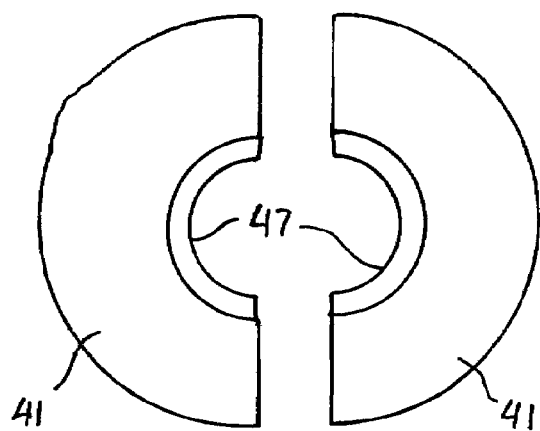
Fig. 21
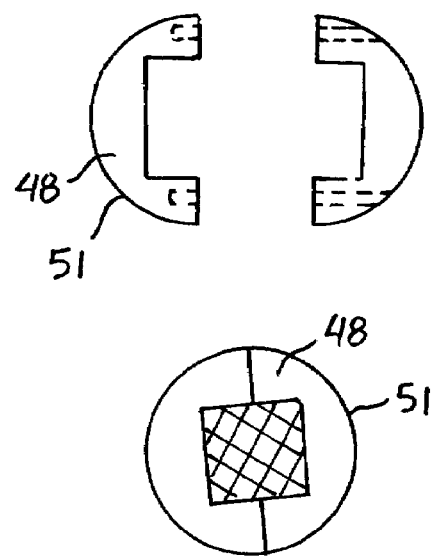
Fig. 22
Fig. 19
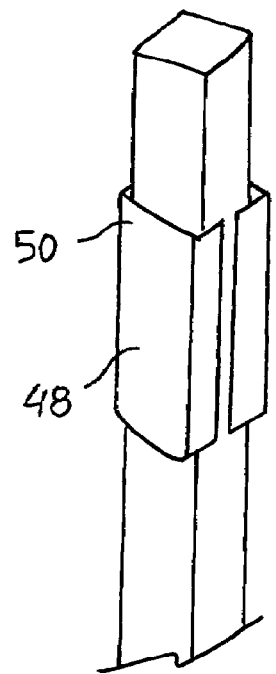
Fig. 20
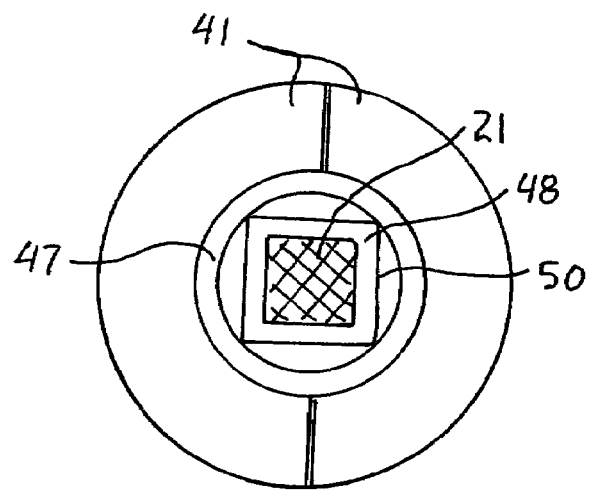

BUMPER ASSEMBLY FOR POSTS AND PILINGS

RELATED APPLICATIONS

This application claims priority of U.S. Provisional Application No. 60/679,737 filed on May 10, 2005, the content of which is incorporated herein by reference.

BACKGROUND OF THE INVENTION

1. Field of the Invention

The present invention relates generally to bumpers for protecting posts and/or pilings from impacts from various things, such as boats or vehicles.

2. Description of the Related Art

In many instances, posts or pilings need to be protected from impact from various things, such as boats or vehicles. There are many devices in the prior art that are used for this purpose. For example, FIGS. 1 and 2 illustrate conventional bumper assemblies 10, 15 attached to a post 11. The bumper 10 in FIG. 1 is attached to the post 11 using a strap 12 that secures the bumper 10 to one side of the post 11. The bumper 15 in FIG. 2 is attached to the post 11 by inserting threaded fasteners, such as lag screws, through recessed openings 13 in the face of the bumper 15. These conventional bumper assemblies 10, 15 have significant disadvantages.

FIGS. 3 and 4 are top views of the bumper assemblies 10, 15 shown in FIGS. 1 and 2, respectively. The arrows A in FIGS. 3 and 4 indicate a major direction of impact against the bumpers 10, 15, and the arrows B in FIGS. 3 and 4 indicate a minor direction of impact (i.e., a glancing blow) against the bumpers. When the bumpers 10, 15 in FIGS. 1 and 2 are struck in the major direction of impact, the bumpers will absorb the shock and readily transmit the impact forces to the post 11. A glancing blow, however, tends to peel the bumper 10, 15 off the post 11, or move it circumferentially from its original position.

SUMMARY OF THE INVENTION

It is an object of the present invention to provide an improved bumper assembly for posts and/or pilings that overcomes the problems with the conventional bumpers described above.

It is a further object of the present invention to provide a hollow core bumper that can be placed over a piling or post to absorb impact forces effectively from multiple directions.

It is a further object of the present invention to provide an improved bumper assembly for posts and/or pilings that is economical to manufacture, easy to install, able to withstand impact forces in any direction, and capable of a long operating life.

To accomplish these and other objects of the present invention, a bumper assembly is provided for attachment to a post having a hollow bumper member with an internal bore that fits over the post and allows the bumper member to rotate around the post. A protective liner is provided between the bumper member and the post and has an internal bore that corresponds with the shape and size of the post so as to fit snugly around the post and be clamped in place on the post. The protective liner has an external wear surface that fits within and rotatably supports the bumper member. A retaining ring can be secured to the post above and/or below the protective liner to hold the bumper assembly in place vertically. Alternatively, the hollow bumper member can be provided with end faces that interact with the upper and lower surfaces of one or a plurality of protective liners positioned within the hollow bumper member to hold the bumper assembly in place vertically. The components of the bumper assembly can be split along one side or provided as two separate halves attachable together to facilitate attachment to posts that are restrained on both ends.

According to a broad aspect of the present invention, a bumper assembly for attachment to a post is provided, comprising: a hollow bumper member having an internal bore that fits over a post and allows the bumper member to rotate on the post; and a means for holding the bumper assembly in place vertically.

According to another broad aspect of the present invention, a bumper assembly for attachment to a post is provided, comprising: a first protective liner assembly having an internal bore adapted to fit around a post on which the bumper assembly is to be attached, and an external wear surface; a hollow bumper member made of a resilient cushion material and having a generally cylindrical-shaped structure with top and bottom end faces, a hollow interior that fits over the external wear surface of the first protective liner and allows the bumper member to rotate on the post relative to the first protective liner, a split opening along at least one side of the hollow bumper member to facilitate mounting over the post, and each of the end faces having a bore therethrough with an inner diameter which is smaller than an inner diameter of the hollow interior to accommodate the post; and the first protective liner is arranged to interact with at least one of the end faces for holding the bumper assembly in place vertically.

Additional objects, advantages, and novel features of the invention will be set forth in the following description, and will become apparent to those skilled in the art upon reading this description or practicing the invention. The objects and advantages of the invention may be realized and attained by the appended claims.

BRIEF DESCRIPTION OF THE DRAWINGS

The present invention will become more clearly appreciated as the disclosure of the present invention is made with reference to the accompanying drawings. In the drawings:

FIG. 11 is an exploded view of a split bumper assembly for attaching to a post according to the present invention.

FIG. 12 is a perspective view of the split bumper assembly shown in FIG. 11 after being assembled onto a post.

FIG. 13 is a perspective view of a split bumper assembly attached to a post with bands according to the present invention.

FIG. 14 is an exploded top view of a split bumper assembly according to the present invention that uses threaded screws to attach the split parts together.

FIG. 15 is an exploded top view of a split bumper assembly according to the present invention that uses mating pieces with keyed faces to attach the split parts together.

FIG. 16 is a front view of the split bumper assembly of FIG. 15 being assembled onto a post by mating and sliding the keyed faces together.

FIG. 17 is a perspective view of a split bumper assembly according to the present invention with multiple bumpers stacked on a post.

FIG. 18 is a top view of a split bumper member according to the present invention having a hard surface provided on the inner face for engaging the post.

FIG. 19 is a perspective view of a protective shield for use when mounting the bumper assembly to a metal post having a square cross section.

FIG. 20 is a cross sectional view of a split bumper assembly with a protective liner mounted to a metal post according to the present invention.

FIG. 21 is a plan view of a protective shield according to another embodiment for use when mounting the bumper assembly to a metal post having a square cross section.

FIG. 22 is a plan view of the protective shield shown in FIG. 21 attached to a post.

DETAILED DESCRIPTION OF THE INVENTION

A hollow core bumper assembly according to the embodiments of the present invention will be described with reference to FIGS. 5 to 27 of the accompanying drawings.

Figure 1:
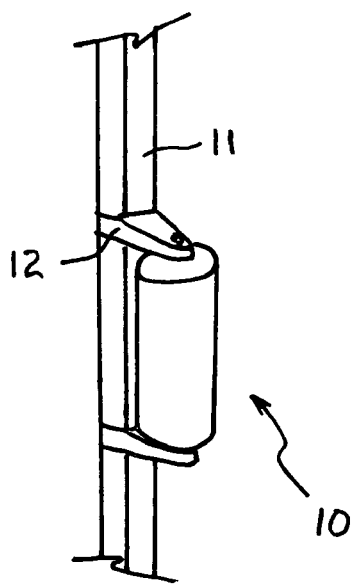
FIG. 1 is a perspective view of a conventional bumper attached to a post with a strap.
Figure 2:
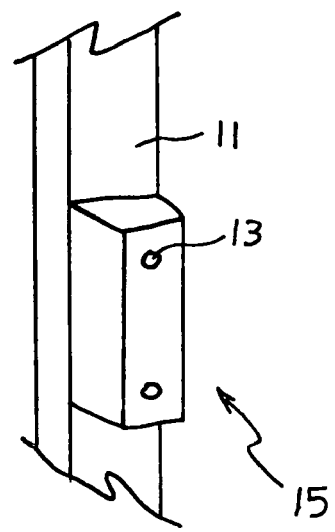
FIG. 2 is a perspective view of a conventional bumper attached to a post with threaded fasteners inserted through recessed openings through the bumper.
Figure 3:
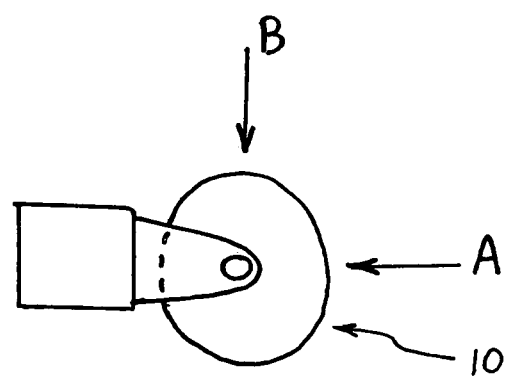
FIGS. 3 and 4 are top views of the conventional bumper assemblies shown in FIGS. 1 and 2, respectively.
Figure 4:
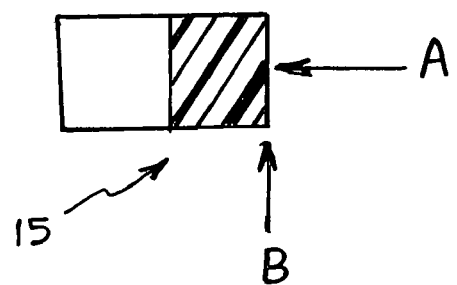
Figure 5:
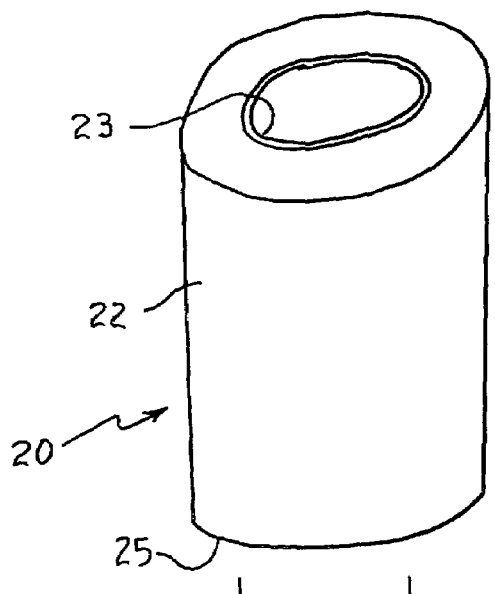
FIG. 5 is an exploded perspective view of a bumper assembly with a protective liner and retaining rings for attaching to a post according to the present invention.
Figure 7:
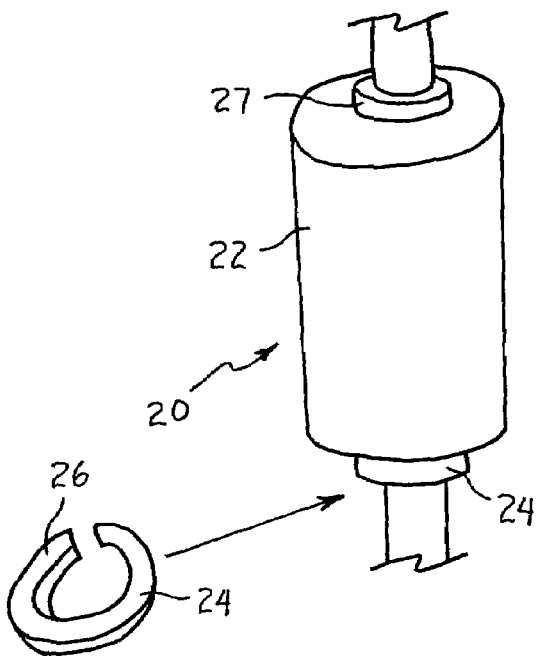
FIG. 7 is a perspective view of the bumper assembly shown in FIG. 5 after being assembled onto a post.
Figure 6:
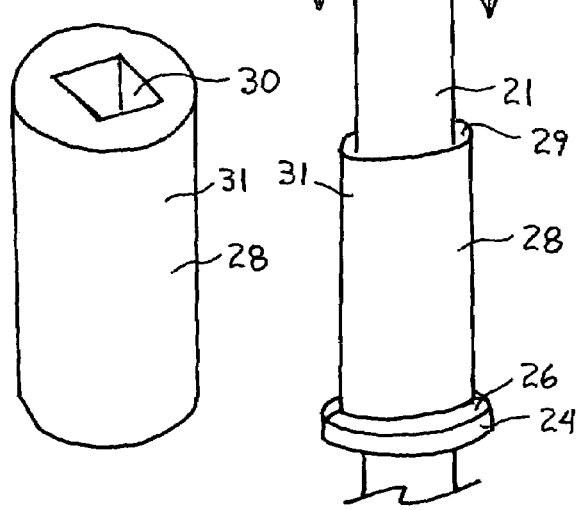
FIG. 6 is a perspective view of a protective liner for a bumper assembly to be placed over a post having a square cross section.
Figure 8:
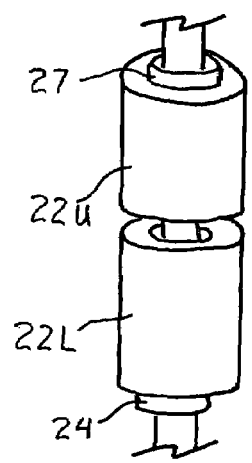
FIG. 8 is a perspective view of a bumper assembly according to the present invention with multiple bumpers stacked on a post.

A bumper assembly 20 for attachment to a post 21 according to a first embodiment of the present invention is shown in FIG. 5. The bumper assembly 20 has a hollow bumper member 22 with an internal bore 23 that fits over the post 21 and allows the bumper member 22 to rotate around the post 21. A retaining ring 24 is secured to the post 21 below the hollow bumper member 22 to hold the bumper assembly 20 in place vertically. The lower surface 25 of the hollow bumper member 22 will rest on the upper surface 26 of the retaining ring 24 after installation.

The retaining ring 24 can be secured to the post 21 by using a resilient material that causes the retaining ring to clamp to the post, or by using threaded fasteners that pass through the retaining ring into the post, or by using a split structure for the retaining ring that can be squeezed onto the post as the retaining ring components are secured together. A second retaining ring 27 can be secured to the post 21 above the hollow bumper member 22 to keep the bumper assembly 20 from being lifted off of the post 21.

The hollow core bumper member 22 of the present invention is preferably made of a resilient cushion material to provide an effective bumper-type structure that absorbs impacts during use. The bumper member 22 can be constructed of several different polymer materials. For example, the bumper member 22 can have a tough polymer skin that encases a gas, liquid, foam or other inert material. The bumper member 22 can also be a solid polymer having a relatively low durometer, or a porous foam polymer.

The hollow core bumper member 22 according to the present invention is intended to rotate on the post 21, which makes it relatively independent of the angle in which it is struck. This allows the bumper member 22 to better maintain its attachment to the post 21. The internal bore 23 of the hollow bumper member 22, which is in contact with the post 21, can be made of a higher durometer polymer or nonpolymer to increase the wear resistance of this surface of the bumper member 22.

A plurality of hollow core bumper members 22 can be "stacked" on the post 21 to provide a larger area of coverage. In this case, a first retaining ring 24 can be positioned below the lower bumper member 22L and a second retaining ring 27 can be positioned above the upper bumper member 22U to hold the bumper assembly 20 in place vertically.

To reduce wear on the post 21 and on the bumper assembly 20 and thereby increase the life and durability of the bumper assembly 20, a protective liner 28 can be provided between the bumper member 22 and the post 21. The protective liner 28 can be, for example, a hard polymer sleeve having an internal bore that can be a round bore 29 (see FIG. 5) or a square bore 30 (see FIG. 6) to correspond with the shape and size of the post 21 so as to fit snugly around the post 21. The protective liner 28 can be slid over the top of the post 21 during installation, as shown in FIG. 5. The protective liner 28 has an external wear surface 31 that fits loosely within and rotatably supports the hollow bumper member 22. The protective liner 28 protects the inner surfaces 23 of the bumper member 22 that rotate relative to the post 21 during impact.

Figure 9:
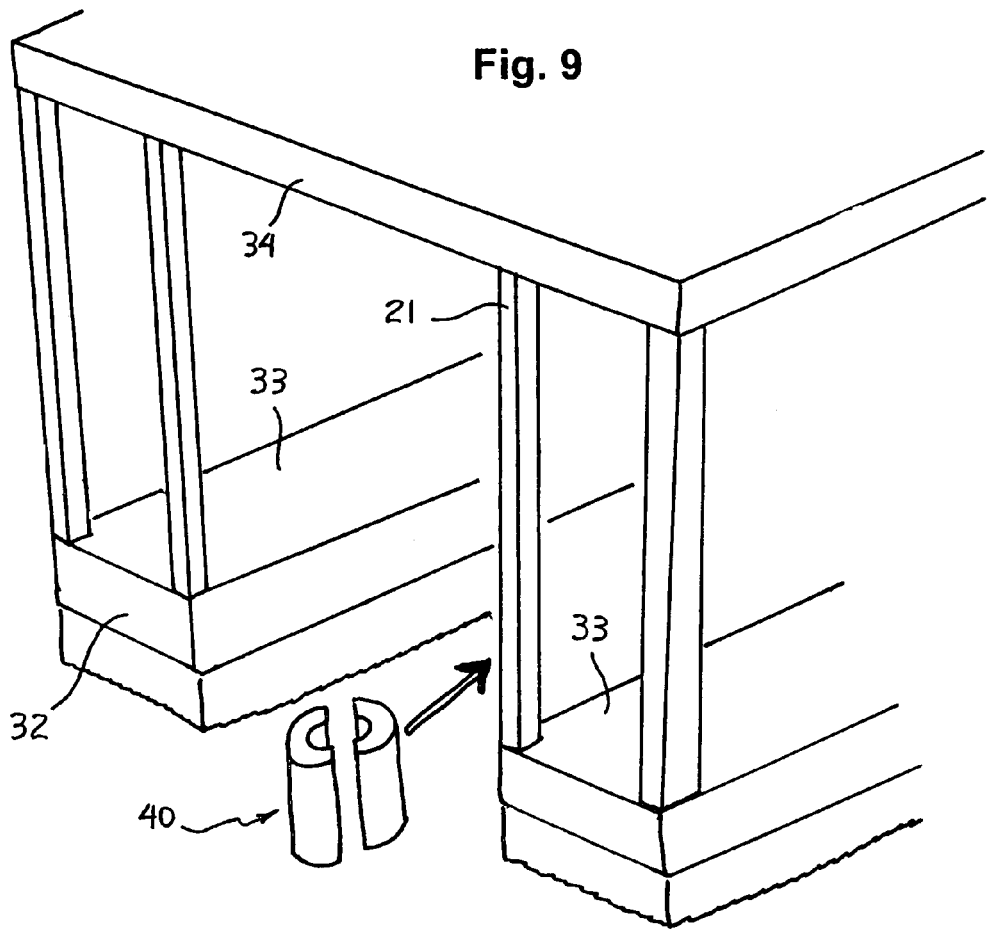
FIG. 9 is a perspective view of a floating boat dock having posts that are constrained at both the base and the top of the post.
Figure 10:
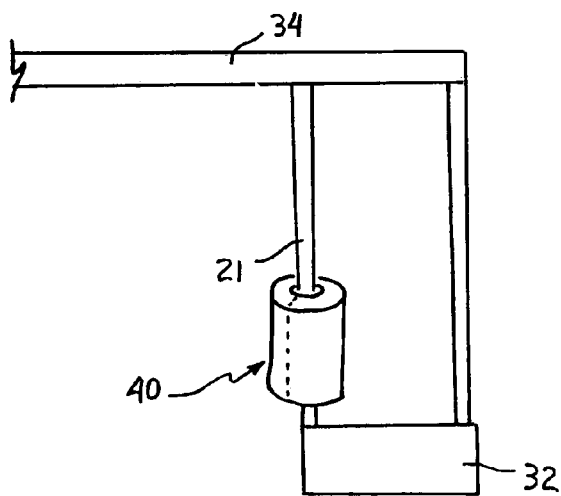
FIG. 10 is an end view of part of the floating boat dock with a bumper assembly according to the present invention installed on one of the posts.
Figure 23:
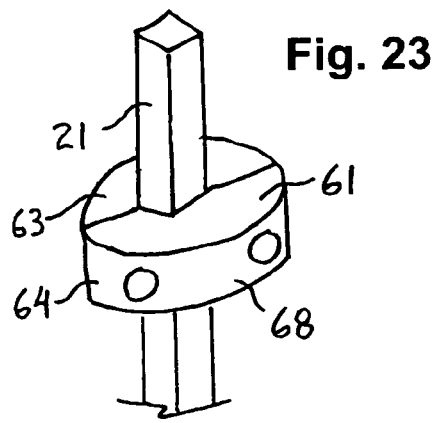
FIG. 23 is a perspective view of a protective liner assembly used in another embodiment of the present invention.
Figure 24:
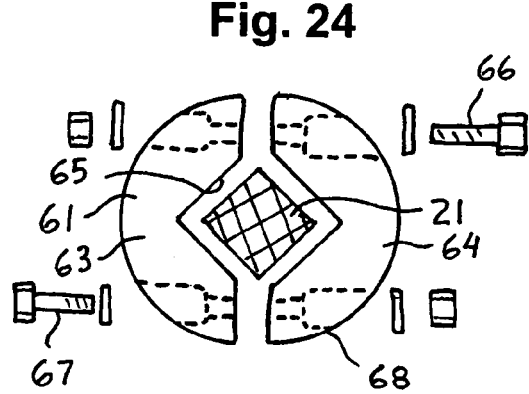
FIG. 24 is a plan view of the protective liner assembly shown in FIG. 23 attached to a post.
Figure 25:
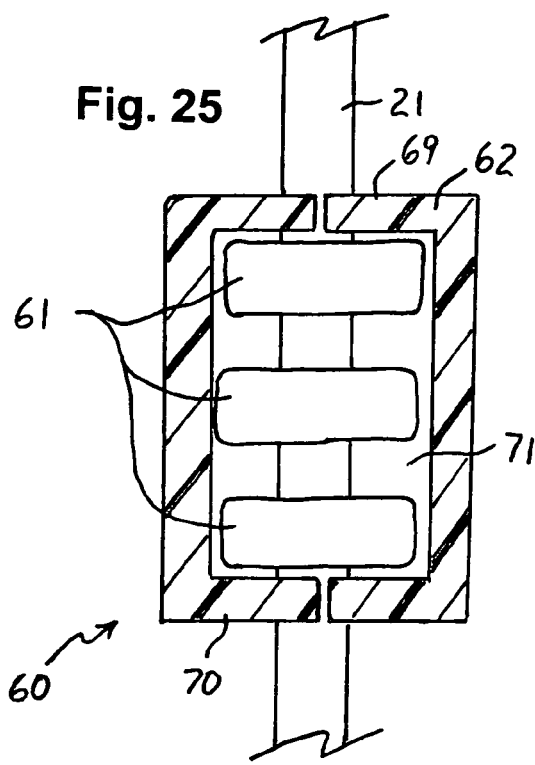
FIG. 25 is an elevation view of a bumper assembly according to another embodiment of the present invention in which a plurality of protective liners are attached to a post and rotatably support a hollow bumper member made of resilient cushion material with top and bottom end faces.
Figure 26:
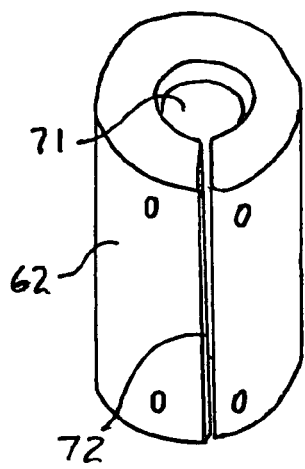
FIG. 26 is a perspective view of the hollow bumper member used in the assembly of FIG. 25.
Figure 27:
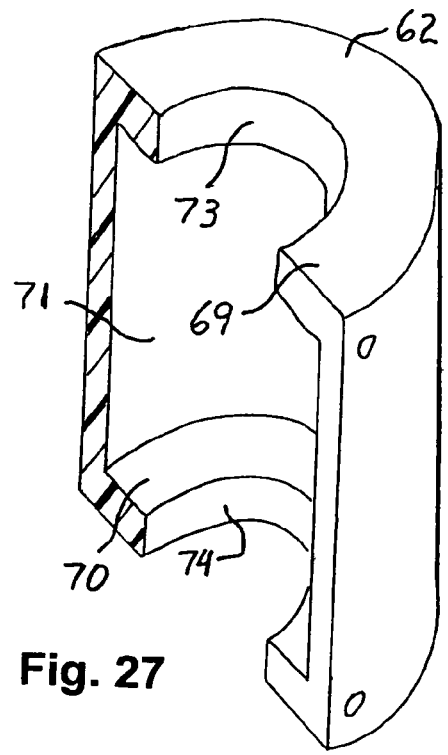
FIG. 27 is a cutaway perspective view of the hollow bumper member shown in FIG. 26.

The bumper assembly 20 described above and shown in FIGS. 5 to 7 works well, except in the case where the post 21 is constrained at both the base and top of the post 21. In that case, the constraints at the ends of the post 21 prevent slipping the bumper assembly 20 over the post 21. An example of this is shown in FIGS. 9 and 10, which illustrate a floating boat dock 32. FIGS. 9 and 10 show a typical floating boat dock construction in which the slip 33 is bound by posts 21 supporting the roof 34 of the dock 32. Similarly, posts that support shelving or a mezzanine in an industrial site would also normally be bound at the top and bottom and prevent the use of the simple hollow core bumper assembly 20 described above and shown in FIGS. 5 to 8.

FIGS. 9 to 20 show various embodiments of the Applicant's invention for accommodating posts 21 that are restrained at both ends. In these embodiments, a split or bifurcated bumper assembly 40 is used that can be attached around the post 21 as shown. This split bumper assembly 40 would be constructed in a similar manner as previously discussed, but provided in two independent pieces for securing around a post 21.

FIGS. 11 to 20 provide a more detailed illustration of these embodiments. As shown in FIGS. 11 and 12, the hollow core bumper member 41 and the retaining ring 42 of the bumper assembly 40 are each formed of two separate pieces that can be assembled around the post 21, even if the ends of the post 21 are restrained. The separate pieces can be banded together using bands 43 (see FIG. 13), screwed together using screws 44 (see FIG. 14), glued together (not shown), or fastened together using other known fastening techniques. The two pieces of the hollow core bumper member 41 can also be provided with key-shaped mating structures 45, 46 along their abutting edges that interlock together without using separate fasteners, as shown in FIGS. 15 and 16.

The split bumper assembly 40 according to this embodiment can also be installed with multiple bumper members 41 stacked on top of each other on a post 21, similar to the embodiment described above and shown in FIG. 8. The split bumper assembly 40 can also have a hard surface material covering the inner bore 47 of the pieces of the bumper member 41, similar to the embodiment described above and shown in FIG. 5.

FIGS. 19 to 22 show additional embodiments in which a protective liner 48 with a split construction is used in conjunction with the split bumper member 41 and the split retaining ring structures 42 described above. The split protective liner 48 has an internal bore 49 with a shape and size that corresponds with the post 21 on which the bumper assembly is to be installed. The liner 48 can have a rectangular outer wear surface 50, as shown in FIGS. 19 and 20, or a round external wear surface 51 that corresponds with the shape and size of the internal bore 47 of the bumper member 41, as shown in FIGS. 21 and 22.

FIGS. 23 to 27 show a bumper assembly 60 according to another embodiment of the present invention. The bumper assembly 60 according to this embodiment has a construction in which a plurality of protective liners 61 are used to rotatably support and hold a hollow bumper member 62 in place on a post 21.

The protective liners 61 each have a pair of liner sections 63, 64 that together define an internal bore 65 adapted to fit around a post 21 on which the bumper assembly 60 is to be attached. A pair of threaded fasteners 66, 67 or other suitable fastener structures are used to secure the liner 61 to the post 21. The internal bore 65 is sized such that tightening the threaded fasteners 66, 67 imparts a clamping force between the liner sections 63, 64 and the post 21. The liner sections 63, 64 have external wear surfaces 68 on their outer peripheries. The protective liners 61 are spaced along the post 21 to support the length of the hollow bumper member 62. In the embodiment illustrated in FIG. 25, three protective liners 61 are attached to the post 21. Those skilled in the art will understand that more or less than three protective liners 61 can be used to adapt the bumper assembly 60 to a particular installation.

The hollow bumper member 62 in this embodiment is made of a resilient cushion material and has a generally cylindrical-shaped structure with top and bottom end faces 69, 70 and a hollow interior 71 that fits over the protective liners 61. The external wear surfaces 68 of the protective liners 61 loosely engage and rotatably support the hollow interior 71 of the hollow bumper member 62, and the hollow bumper member 62 is thereby allowed to rotate on the post 21 relative to the protective liners 61. A split opening 72 is provided along one side of the hollow bumper member 62 to facilitate mounting the bumper member 62 over the post 21. Alternatively, the hollow bumper member can be provided as two separate sections that are attachable together during installation. Each of the end faces 69, 70 of the hollow bumper member 62 has a bore 73, 74 with an inner diameter large enough to accommodate the post 21, but smaller than an inner diameter of the hollow interior 71 of the bumper member 62. The end faces 69, 70 of the bumper member 62 are arranged to abut the uppermost and lowermost protective liners 61 for holding the bumper assembly 60 in place vertically.

To install the bumper assembly 60 according to this embodiment, the protective liners 61 are first secured to the post 21 at desired positions using the threaded fasteners 66, 67. The uppermost and lowermost protective liners 61 are spaced a distance that corresponds with the length of the bumper member 62. The hollow bumper member 62 is then spread apart along its split opening 72 a sufficient amount so that the bumper member 62 can be installed over the protective liners 61. The hollow bumper member 62 is then released and allowed to resiliently regain its cylindrical shape with the protective liners 61 positioned within the hollow interior 71. Additional threaded fasteners or other suitable attachment means can be used to secure the split opening 72 of the hollow bumper member 62 together to lock the bumper member 62 in its installed position on the post 21.

As used in this application, the term "post" is intended to cover posts and pilings and other vertical structures in the nature of poles, columns and the like that are used in various places where they are prone to being bumped, including but not limited to boat docks, piers, warehouse shelving, industrial sites, shopping centers, and so forth.

While the invention has been specifically described in connection with specific embodiments thereof, it is to be understood that this is by way of illustration and not of limitation.

What is claimed is:

1. A bumper assembly for attachment to a post, comprising:
   a hollow bumper member having an internal bore that fits over a post and allows the bumper member to surround and rotate on the post;
   a protective liner having an internal bore adapted to fit around a post on which the bumper assembly is to be attached, and an external wear surface, and a means for attaching the protective liner to the post in a manner that prevents rotation of the protective liner on the post;
   wherein the internal bore of the hollow bumper member fits over the external wear surface of the protective liner and allows the bumper member to rotate around and relative to the protective liner;
   wherein said protective liner and said hollow bumper member are each split along at least one side to facilitate installation over a post that is restrained at both its ends; and
   a means for holding the bumper assembly in place vertically on the post while still allowing rotation of the bumper member around and relative to the protective liner.

2. The bumper assembly according to claim 1, wherein said means for holding the bumper assembly in place vertically comprises a retaining ring adapted to be secured to the post below the protective liner and the bumper member.

3. The bumper assembly according to claim 1, wherein a plurality of protective liners and hollow bumper members are stacked on top of each other on the post.

4. The bumper assembly according to claim 1, wherein the internal bore of the protective liner has a generally square cross section for fitting over a square post, and the external wear surface has a generally cylindrical shape for engaging the internal bore of the hollow bumper member.

5. The bumper assembly according to claim 1, wherein the internal bore of the protective liner has a generally round cross section for fitting over a round post, and the external wear surface has a generally cylindrical shape for engaging the internal bore of the hollow bumper member.

6. The bumper assembly according to claim 1, wherein the internal bore of said hollow bumper member is covered by a hard surface material that has a higher durometer than an external surface of the hollow bumper member to increase a wear resistance of the internal surface of the bumper member.

7. The bumper assembly according to claim 1, wherein said hollow bumper member comprises first and second sleeve sections that are attachable together to form a sleeve-shape with the internal bore that fits over a post and allows the bumper to be installed and rotate on a post that is restrained at both its ends.

8. The bumper assembly according to claim 1, wherein said means for holding the bumper assembly in place vertically comprises first and second retaining ring sections that are attachable together to form a retaining ring that can be installed on and clamped to a post that is restrained at both its ends to engage the bumper member.

9. The bumper assembly according to claim 1, wherein said means for holding the bumper assembly in place vertically comprises a first retaining ring positioned below the bumper member and a second retaining ring positioned above the bumper member.

10. The bumper assembly according to claim 1, wherein said hollow bumper member comprises first and second sleeve sections that can be secured together over a post that is restrained at both ends using at least one band member that surrounds an external surface of the hollow bumper member.

11. The bumper assembly according to claim 1, wherein said hollow bumper member comprises first and second sleeve sections that are secured together over a post using threaded fasteners.

12. The bumper assembly according to claim 1, wherein said hollow bumper member comprises first and second sleeve sections that are secured together over a post using mating structures that interlock together.

13. The bumper assembly according to claim 1,
wherein said hollow bumper member comprises a generally cylindrical-shaped structure with top and bottom end faces, a hollow interior that fits over the external wear surface of the first protective liner and allows the bumper member to rotate on the post relative to the first protective liner, a split opening along at least one side to facilitate mounting over the post, and each of the end faces have a bore therethrough with an inner diameter smaller than an inner diameter of the hollow interior to accommodate a post on which the bumper member is attached, and at least one of the top and bottom end faces engages the first protective liner for holding the bumper assembly in place vertically.

14. The bumper assembly according to claim 13, further comprising a second protective liner having an internal bore adapted to fit around a post on which the bumper assembly is to be attached, and an external wear surface adapted to fit within and rotatably support the hollow interior of the bumper member, wherein said second protective liner is positioned below said first protective liner, said first protective liner interacts with the top end face of the bumper member to prevent downward movement of the bumper assembly, and said second protective liner interacts with the bottom end face of the bumper member to prevent upward movement of the bumper assembly.

15. A bumper assembly for attachment to a post, comprising:
a first protective liner assembly having an internal bore adapted to fit around a post on which the bumper assembly is to be attached, and an external wear surface, said protective liner assembly having a split along at least one side thereof to facilitate installation over a post that is restrained at both its ends;
means for attaching the first protective liner assembly to the post in a manner that prevents rotation of the protective liner on the post;
a hollow bumper member made of a resilient cushion material and having a generally cylindrical-shaped structure with top and bottom end faces, a hollow interior that fits over the external wear surface of the first protective liner assembly and allows the bumper member to rotate around and relative to the first protective liner assembly, a split opening along at least one side of the hollow bumper member to facilitate mounting over a post that is restrained at both its ends, and each of the end faces having a bore therethrough with an inner diameter which is smaller than an inner diameter of the hollow interior to accommodate the post;
said first protective liner assembly providing a means for interacting with at least one of the end faces for holding the bumper assembly in place vertically while still allowing the bumper assembly to rotate around and relative to the first protective liner assembly.

16. The bumper assembly according to claim 15, further comprising a second protective liner having an internal bore adapted to fit around the post on which the bumper assembly is to be attached, said second protective liner having an external wear surface adapted to fit within and rotatably support the hollow interior of the bumper member, said second protective liner being positioned below said first protective liner, wherein said first protective liner interacts with the top end face of the bumper member to restrict downward movement of the bumper assembly, and said second protective liner interacts with the bottom end face of the bumper member to restrict upward movement of the bumper assembly.

17. The bumper assembly according to claim 15, wherein the internal bore of said hollow bumper member is covered by a hard surface material that has a higher durometer than the resilient cushion material of the hollow bumper member to increase a wear resistance of the internal surface of the bumper member.

\* \* \* \* \*